United States Patent [19]

Saunders, Jr. et al.

[11] Patent Number: 4,788,108

[45] Date of Patent: Nov. 29, 1988

[54] ULTRAVIOLET LIGHT CURABLE COMPOSITIONS BASED ON IMINATED UNSATURATED POLYESTERS FOR APPLICATION TO POROUS SUBSTRATES

[75] Inventors: John B. Saunders, Jr., Allison Park; Robert M. Piccirilli; William J. Schillinger, both of Gibsonia; Ken W. Niederst, Allison Park, all of Pa.

[73] Assignee: PPG Industries, Inc., Pittsburgh, Pa.

[21] Appl. No.: 62,029

[22] Filed: Jun. 15, 1987

[51] Int. Cl.$^4$ ............... B32B 27/10; C08G 63/46
[52] U.S. Cl. ............... 428/481; 427/54.1; 427/391; 427/393; 522/43; 522/44; 522/107; 522/108; 525/445; 528/288; 528/291
[58] Field of Search ............... 522/107, 108; 528/291, 528/288; 525/445; 428/481; 427/54.1, 391, 393

[56] References Cited

U.S. PATENT DOCUMENTS

| | | | |
|---|---|---|---|
| 3,262,991 | 7/1966 | McClendon | 528/288 |
| 3,290,417 | 12/1966 | Christenson et al. | 260/901 |
| 3,949,141 | 4/1976 | Marzocchi | 528/288 |
| 3,993,798 | 11/1976 | Brose | 522/107 |
| 4,425,287 | 1/1984 | Hesse | 522/107 |
| 4,528,333 | 7/1985 | Chang | 528/289 |

FOREIGN PATENT DOCUMENTS

| | | |
|---|---|---|
| 1694845 | 2/1967 | Fed. Rep. of Germany . |
| 2352524 | 5/1974 | Fed. Rep. of Germany ...... 522/107 |
| 2109257 | 10/1979 | United Kingdom . |

OTHER PUBLICATIONS

Abstract for JP 55089316 of Sony Corp., published Jul. 5, 1980.
Abstract for JP 48102891 of Hitachi Chemical, published Dec. 24, 1973.

*Primary Examiner*—John C. Bleutge
*Assistant Examiner*—David Buttner
*Attorney, Agent, or Firm*—Thomas M. Breininger

[57] ABSTRACT

Disclosed is a curable filler composition which resists absorption into a porous substrate, particularly one derived from wood, comprising: (1) a liquid, ungelled binder of an unsaturated polyester resin having number average molecular weight of from 500 to 3,000 derived from an ethylenically unsaturated carboxylic acid or anhydride thereof, the unsaturated polyester resin having been iminated with an alkylenimine, (2) one or more ethylenically unsaturated compounds different from and cocurable with the unsaturated polyester resin, (3) pigment, (4) a free radical initiator, and (5) optionally a carrier solvent for the filler composition.

Disclosed is a method of minimizing absorption of a filler composition into a warm or hot porous substrate.

Also disclosed is a porous substrate, particularly one derived from wood, having adhered to a substrate thereof the cured filler composition.

17 Claims, No Drawings

4,788,108

ULTRAVIOLET LIGHT CURABLE COMPOSITIONS BASED ON IMINATED UNSATURATED POLYESTERS FOR APPLICATION TO POROUS SUBSTRATES

BACKGROUND AND FIELD OF THE INVENTION

The present invention relates to the use of curable, particularly ultraviolet light (UV) curable, compositions as fillers for porous substrates, particularly wood-based porous substrates, to render them smooth and suitable for further processing.

Porous substrates derived from wood such as particleboard, chipboard, composition board, as well as paper products, generally have a wide range of porosity, absorbancy, and microscopic and macroscopic surface irregularities as compared to, for example, glass and metal substrates. On a microscopic level, they present a random array of peaks and valleys and also roughness due to the presence of fibers in the surface. Such characteristics of these substrates generally make them unsuitable for the efficient application of decorative topcoating compositions directly to the substrate where a smooth appearance is desired. Such wood based, topographically irregular, substrates often are coated with compositions typically referred to as "fillers" to help provide a smooth surface.

However, the porosity and topographical irregularities of such substrates also make the efficient application of filler compositions itself difficult. For example, if the filler is substantially absorbed by, or "drunk in" by, the substrate, the surface irregularities in the substrate remain. When such substrates are warm or hot, for example after particleboard is removed from a press during manufacture, they tend to drink in the filler composition even more. Moreover, this problem can be compounded by the loss of more volatile components from the filler composition while it is in contact with the warm or hot substrate before it hardens or cures. Thus, the absorption of the filler composition by the substrate results in inefficiency of production as well as undesirable appearance imperfections in the final product.

The present invention is directed to alleviating these problems through the use of a specially formulated composition, preferably one which is curable by exposure to ultraviolet light.

SUMMARY OF THE INVENTION

The present invention is for a porous substrate, particularly one derived from wood, having adhered to a surface of the substrate, but not substantially penetrating the substrate, a cured filler composition, particularly an ultraviolet light cured filler composition. The filler composition comprises: (1) a liquid, ungelled binder of an ethylenically unsaturated polyester resin having a number average molecular weight of from 500 to 3,000 derived from an ethylenically unsaturated carboxylic acid or anhydride thereof having an acid functionality of at least two and an organic polyol, the unsaturated polyester resin having been reacted with an alkylenimine, (2) one or more ethylenically unsaturated compounds different from and cocurable with the unsaturated polyester resin, (3) a pigment, particularly an ultraviolet light transparent pigment where the composition is to be cured utilizing ultraviolet light, (4) a free radical initiator, particularly a photocuring promoter selected from the group consisting of a photoinitiator, a photosensitizer and a mixture thereof where the composition is to be cured utilizing ultraviolet light, and (5) optionally a carrier solvent for the filler composition, particularly one which is insensitive to ultraviolet light where the composition is to be cured utilizing ultraviolet light.

The invention is also for a method of minimizing absorption of a filler composition into a warm or hot porous substrate, particularly one derived from wood, comprising the steps of (A) applying to a surface of the porous substrate having a surface temperature of from about 38 to about 88 degrees Celsius, a filler composition which is curable utilizing a free radical initiator, particularly a filler composition which is curable utilizing ultraviolet light, as described above; and (B) curing the filler composition, particularly by exposing the filler composition to ultraviolet light.

The invention also is for a curable filler composition, particularly an ultraviolet light curable filler composition, which resists absorption into a porous substrate, particularly one derived from wood, comprising: (1) from 30 percent to 55 percent by weight of a binder of an unsaturated polyester resin having a number average molecular weight of from 500 to 3,000 derived from an ethylenically unsaturated carboxylic acid or anhydride thereof having an acid functionality of at least two and an organic polyol, the unsaturated polyester resin having been iminated with an alkylenimine, (2) from 50 percent to 10 percent by weight of one or more ethylenically unsaturated compounds different from and cocurable with the unsaturated polyester resin, (3) from 20 percent to 60 percent by weight of a pigment, particularly an ultraviolet light transparent pigment, (4) at least 0.33 percent by weight of a free radical initiator, particularly a photocuring promoter selected from the group consisting of a photoinitiator, a photosensitizer and a mixture thereof, and (5) from 0 percent to 10 percent by weight of a carrier solvent for the filler composition, particularly one which is insensitive to ultraviolet light.

DETAILED DESCRIPTION OF THE INVENTION

The filler composition to which the present invention is directed is a curable liquid, preferably curable upon exposure to ultraviolet light. The filler composition comprises: (1) from 30 percent to 55 percent by weight of a liquid, ungelled binder of an unsaturated polyester resin having a number average molecular weight of from 500 to 3,000 derived from an ethylenically unsaturated carboxylic acid or anhydride thereof having an acid functionality of at least two and an organic polyol, the unsaturated polyester resin having been iminated with an alkylenimine, (2) from 50 percent to 10 percent by weight of one or more ethylenically unsaturated compounds different from and cocurable with the unsaturated polyester resin, (3) from 20 percent to 60 percent by weight of a pigment, preferably an ultraviolet light transparent pigment, (4) at least 0.33 percent by weight of a free radical initiator, preferably one which is a photocuring promoter selected from the group consisting of a photoinitiator, a photosensitizer and a mixture thereof, and (5) from 0 percent to 10 percent by weight of a carrier solvent for the filler composition. Optional component (5) generally is not preferred in the UV curable composition since such solvents often tend to inhibit the cure of the composition and also may volatilize from the composition which may be undesirable from an environmental standpoint.

Component (1) of the filler composition comprises a binder of an unsaturated polyester resin which has been iminated with an alkylenimine. The preparation of unsaturated polyesters by the reaction of polycarboxylic acid or anhydride with polyhydric alcohol is well-known in the art. It is also known to blend unsaturated polyesters with a reactive diluent such as styrene, methyl methacrylate or other polymerizable monomeric monofunctional or polyfunctional vinyl or acrylic compounds to produce, for example, a thermosetting mixture. Processes for making unsaturated polyesters include batch processes as described in U.S. Pat. No. 4,018,815 and continuous processes as described in U.S. Pat. No. 3,911,048.

Ethylenically unsaturated polyesters for the present invention ordinarily are esterification products of ethylenically unsaturated carboxylic acids and organic polyhydric alcohols (organic polyols). Usually, an unsaturated carboxylic acid having an acid functionality of at least two, more particularly a dicarboxylic acid or its anhydride, is utilized as a starting reactant. Examples of unsaturated dicarboxylic acids and anhydrides include: maleic acid, maleic anhydride, fumaric acid and itaconic acid. Maleic anhydride is a desirable dicarboxylic component to make the unsaturated polyester resin since it is relatively inexpensive. However, the maleate esters do not copolymerize with conventional monomers such as vinyl toluene and styrene as readily as do the fumarate esters. Esters derived from the trans isomer of maleic acid, i.e., fumaric acid, do react rapidly with vinyl toluene and styrene. The curable compositions for the present invention utilize one or more ethylenically unsaturated compounds, different from the unsaturated polyester, which are cocurable with the unsaturated polyester resin, preferably cocurable with the unsaturated polyester upon exposure to ultraviolet light. Accordingly, fumarate esters are preferred for making the unsaturated polyester for the present invention.

Unsaturated polyesters for the present invention, where desired, also can be prepared utilizing a saturated polycarboxylic acid as a portion of the polycarboxylic component. Preferred unsaturated polyester resins for the present invention, however, typically are prepared utilizing just the unsaturated polycarboxylic acid or its anhydride with the polyhydric alcohol component. Examples of saturated polycarboxylic acids which optionally may be used include: phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, and 2,2-dimethylglutaric acid. Of course, anhydrides of the aforementioned acids, where they exist, also can be utilized.

Examples of organic polyols suitable for preparing the unsaturated polyester resin include: diethylene glycol, ethylene glycol, propylene glycol, dipropylene glycol, butylene glycol, glycerol, trimethylolpropane, pentaerythritol, sorbitol, 1,6-hexanediol, 1,4-cyclohexanediol, 1,4-cyclohexanedimethanol, 1,2-bis(hydroxyethyl)cyclohexane, and 2,2-dimethyl-3-hydroxypropyl-2,2-dimethyl-3-hydroxypropionate. Organic polyols which are diols are preferred. Diethylene glycol is particularly preferred since it is readily available and is relatively inexpensive. While organic polyols having a hydroxyl functionality of greater than 2 may be employed in the preparation of the unsaturated polyester resin, it is preferred that the major portion, if not all of the unsaturated polyester resin, be comprised of unsaturated polyester molecules which are linear; hence the preference for diols.

Polyester resins suitable for the present invention generally have a number average molecular weight of from 500 to 3,000. Typically they are prepared by utilizing dicarboxylic acid or anhydride and diol in a molar ratio of diol to acid of from about 1.10/1.00 to about 1.20/1.00. It has been found that unsaturated polyester resins prepared from ratios of diol, such as diethylene glycol, and acid, such as fumaric acid, much higher than 1.20/1.00 do not perform as well with respect to resistance to absorption into a warm or hot, wood-based porous substrate compared to those prepared utilizing the aforesaid molar ratio of diol to acid. Moreover, while unsaturated polyester resins having a number average molecular weight higher than 3,000 can be used in the present invention, for example prepared utilizing a molar ratio of diol to acid closer to 1.00/1.00, such unsaturated polyester resins of higher molecular weight tend to be difficult to prepare without gelation utilizing typical polymerization techniques.

The unsaturated polyester resins may be prepared by heating the polycarboxylic component and organic polyol component together for about 1 to 10 hours to temperatures of from about 165° C. to about 250° C., with water formed during the esterification being distilled off using a sparge of an inert gas such as nitrogen. Esterification catalysts for increasing the rate of reaction can also be used. Examples of known catalysts useful for this purpose include para-toluenesulfonic acid, butylstannoic acid, dibutyltin oxide and stannous fluoride. The unsaturated polyester resin, prior to imination, contains residual acid groups (e.g., COOH functionality). While the acid value of the unsaturated polyester resin may vary, typically unsaturated polyester resins prepared for the present invention have an acid value of from about 10 to about 15.

An important feature of the present invention is that the unsaturated polyester resin be iminated, that is reacted with an alkylenimine. It has been found that a curable composition according to the present invention in which the unsaturated polyester resin is iminated resists absorption into a wood-based porous substrate much better than an unsaturated polyester resin of comparable number average molecular weight which is not iminated.

Various alkylenimines, including substituted alkylenimines, can be used to iminate unsaturated polyester resins for the present invention. Generally, the alkylenimines should have either two or three carbon atoms in the alkylenimine ring or rings. The preferred class of such imines are those corresponding to the formula:

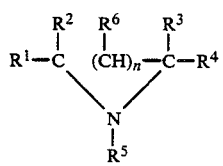

wherein $R^1$, $R^2$, $R^3$, $R^4$ and $R^5$ are each independently hydrogen; alkyl or hydroxyalkyl such as methyl, ethyl, propyl, hydroxyethyl, or the like, having for example, up to about 20 carbon atoms; aryl, such as phenyl or the like; alkaryl, such as tolyl, xylyl, or the like; or aralkyl, such as benzyl, phenethyl, or the like. $R^6$ in the above formula is hydrogen or a lower alkyl radical usually having not more than about 6 carbon atoms; and n is an integer from 0 to 1.

It is intended that the groups designated by the above formula include any substituted radicals of the classes indicated where the substituent groups do not adversely affect the basic nature of the imine in the reaction with the unsaturated polyester. Examples of such substituents include the groups such as carbonyl, cyano, halo, hydroxy, alkoxy, carbalkoxy and nitrile. The substituted groups may thus be cyanoalkyl, acyl (e.g., acetyl), haloalkyl, hydroxyalkyl, alkoxyalkyl, carbalkoxyalkyl, and similar substituted derivatives of aryl, alkaryl, and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R^1$ through $R^6$ represent hydrogen. However, the efficacy of the various alkylenimines (whether or not within the above formula) is believed not to depend upon the particular nature of the substituents, but rather upon the imine linkage.

Specific examples of alkylenimines within the class described above include: hydroxyethylethylenimine (2-(2-hydroxyethyl)aziridine), ethylenimine (aziridine), 1,2-propylenimine (2-methylaziridine), 1,3-propylenimine (azetidine), 1,2-dodecylenimine (2-decylaziridine), 1,1-dimethyl ethylenimine (2,2-dimethylaziridine), phenylethylenimine (2-phenylaziridine), tolylethylenimine (2-(4-methylphenyl)aziridine), benzylethylenimine (2-phenylmethylaziridine), 1,2-diphenylethylenimine (2,3-diphenylaziridine), 2-methyl propylenimine (2-methylazetidine), 3-chloropropylethylenimine (2-(3-chloropropyl)aziridine), p-chlorophenylethylenimine (2-(4-chlorophenyl)aziridine), methoxyethylethylenimine (2-(2-methoxyethyl)aziridine), dodecylaziridinyl formate (dodecyl 1-aziridinyl formate), carbethoxyethylethylenimine (2-(2-carboethoxyethyl)aziridine), N-ethylethylenimine (1-ethylaziridine), N-butylethylenimine (1-butylaziridine), N-(phenethyl)ethylenimine (1-(2-phenylethyl)aziridine), N-(cyanoethyl)ethylenimine (1-cyanoethylaziridine), N-phenylethylenimine (1-phenylaziridine), N-tolylethylenimine (1-(2-methylphenyl)aziridine), N-(p-chlorophenyl)ethylenimine (1-(4-chlorophenyl)aziridine), and N-(2-carboethoxy-1-ethyl)ethylenimine (ethylaziridyl propionate).

Because of their availability and because they are among the most effective, the preferred imines are alkylenimines and substituted alkylenimines having 2 to 4 carbon atoms, and especially ethylenimine, 1,2-propylenimine, and N-hydroxyethyl ethylenimine. N-hydroxyethyl ethylenimine is particularly preferred. It is to be understood that the term, alkylenimines, as that term is used in the instant invention includes all the above-described alkylenimines, both substituted and otherwise.

The reaction of the ethylenically unsaturated polyester with the alkylenimine (i.e., the imination reaction) can be performed by admixing the imine with the unsaturated polyester and heating to a moderate temperature, for example from about 25° C. to about 150° C., preferably from about 40° C. to about 80° C., although higher or lower temperature may be used depending upon the desired reaction time. The imine reacts with acidic groups (COOH) on the unsaturated polyester resin, but the exact nature of the reaction which takes place under these circumstances and the structure of the product obtained is not known with certainty. Reaction of acid functionality of the unsaturated polyester resin with the alkylenimine typically reduces the acid functionality of the polyester resin to a value below about 5.

Component (2) of the filler composition comprises one or more ethylenically unsaturated compounds different from and cocurable with the unsaturated polyester resin. Generally, the ethylenically unsaturated compounds for component (2) are low molecular weight materials with are compatible with the other components of the composition. They may be monomeric, oligomeric or polymeric; however monomeric and oligomeric compounds are preferred. An important consideration for the compounds of component (2) is that they are cocurable with the ethylenically unsaturated polyester resin of component (1).

Examples of cocurable ethylenically unsaturated monomers or oligomers which may be used in the invention include: vinyl monomers such as vinyl acetate, styrene, vinyl toluene and divinyl benzene; acrylic and methacrylic esters such as methyl (meth)acrylate, ethyl (meth)acrylate, isopropyl (meth)acrylate, n-butyl (meth)acrylate, isobutyl (meth)acrylate, 2-ethylhexyl (meth)acrylate, 2-hydroxyethyl (meth)acrylate, glycidyl (meth)acrylate, ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth)acrylate, dipropylene glycol di(meth)acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane di(meth)acrylate, trimethylolpropane tri(meth)acrylate, 2,2-dimethyl-3-hydroxypropyl-2,2-dimethyl-3-hydroxypropionate, isobornyl (meth)acrylate and tetrahydrofurfuryl (meth)acrylate; (meth)acrylates derived from aromatic glycidyl ethers such as bisphenol-A-diglycidyl ether and aliphatic glycidyl ethers such as butanediol diglycidyl ether, specific examples of which include 1,4-butanediol diglycidylether di(meth)acrylate, bisphenol-A-diglycidylether di(meth)acrylate and neopentylglycol diglycidylether di(meth)acrylate; and acrylic or methacrylic amides such as (meth)acrylamide, diacetone (meth)acrylamide, N(beta-hydroxyethyl) (meth)acrylamide, N,N-bis(beta-hydroxyethyl) (meth)acrylamide, methylene bis(meth)acrylamide, 1,6-hexamethylene bis(meth)acrylamide, diethylenetriamine tris(meth)acrylamide, bis(gamma-(meth)acrylamidepropoxy) ethane and beta-(meth)acrylamide ethylacrylate.

Of the examples of cocurable ethylenically unsaturated monomers and oligomers described above, the vinyl monomers are preferred because of their good reactivity with unsaturated polyesters, availability and cost. Vinyl toluene is particularly preferred over, for example styrene, because it is less volatile than styrene and does not tend to volatilize from a warm or hot substrate as readily. Of the examples of the various acrylates and methacrylates described above, the methacrylates are preferred since the acrylates tend to polymerize with themselves more than the methacrylates when in the presence of the unsaturated polyester resin. It has also been found that the ethylenically unsaturated amides described above show good reactivity toward unsaturated polyester resins; however they tend to be relatively costly.

The curable filler composition for the invention also contains a pigment. For an ultraviolet light curable filler composition of the invention, the pigment is an ultraviolet light transparent pigment. The phrase "ultraviolet light transparent" is used to mean that the pigment utilized in a filler composition according to the invention does not significantly interfere with curing of the composition when curing is effected by exposing the filler composition to ultraviolet light. Coloring pigments generally employed to impart color in conventional, non-UV cured, coating compositions typically absorb or block ultraviolet light thereby interfering with UV curing of the composition. Accordingly, where some degree of color tinting of the film is desired, such conventional coloring pigments should be employed in only limited amounts when cure is to be effected utilizing UV. Typically, UV curable compositions according to the present invention do not contain conventional coloring pigments.

The pigment utilized in a composition according to the invention also helps prevent absorption of the composition into the porous substrate. Where means other than ultraviolet light are contemplated for curing a composition of the invention, the choice of pigment is not particularly limited. However, for the preferred compositions which are curable by exposure to UV, it is preferred to utilize UV transparent pigments examples of which include, the so called "platy" or flat type UV transparent extender pigments in which the which the length of the pigment particles can be several times the thickness of the particles. Talc is a UV transparent, platy pigment which is particularly preferred. Other examples of ultraviolet light transparent pigments which may be utilized in the preferred filler composition include almost any of the noncoloring, so-called extender pigments specific examples of which include: calcium carbonate, aluminum silicate, magnesium silicate, barytes and silica ($SiO_2$). It is also believed that a combination of pigments having different mean particles sizes (e.g., two talcs which differ in mean particle size) also improves the ability of the filler composition to prevent absorption of the composition into the porous substrate, such as a wood-based porous substrate, and such a combination is also preferred for the present invention.

A composition of the invention also contains a free radical initiator (sometimes referred to as a curing catalyst). Examples of curing catalysts for utilization in a composition of the invention where UV curing is not desired include the generally known initiators for curing unsaturated polyesters, some specific examples of which include peroxides such as benzoyl peroxide, methyl ethyl ketone peroxide, cumene hydroperoxide, cyclohexanone peroxide, 2,4-dichlorobenzoyl peroxide, bis(p-bromobenzoyl) peroxide and acetyl peroxide. An ultraviolet light curable composition according to the invention contains a photocuring promoter selected from the group consisting of a photoinitiator, a photosensitizer and a mixture thereof. Photoinitiators and photosensitizers for use in ultraviolet light curable compositions are generally known in the art of UV curable compositions. Examples of photosensitizers include benzophenone, anthraquinone, and thioxanthone. Examples of photoinitiators include isobutyl benzoin ether, mixtures of butyl isomers of butyl benzoin ether, alpha,alpha-diethoxyacetophenone, and alpha,alpha-dimethoxy-alpha-phenylacetophenone. Other examples of photoinitiators and photosensitizers can be found in U.S. Pat. No. 4,017,652.

A composition according to the invention may also contain from 0 to 10 percent by weight of a carrier solvent such as conventional aliphatic or aromatic solvent or diluents known in the art. However, their use in compositions according to the invention is not preferred especially because they tend to be volatile and often tend to retard UV cure of the composition. Noteworthy in this regard are aromatic solvents such as toluene and xylene.

Ultraviolet light (UV radiation) is utilized in the preferred method of the invention to cure the UV curable liquid composition. Any suitable source which emits ultraviolet light having a wavelength ranging from about 180 to about 400 nanometers may b employed. Suitable sources of ultraviolet radiation are generally known and include, for example, mercury arcs, carbon arcs, low pressure mercury lamps, medium pressure mercury lamps, high pressure mercury lamps, swirl-flow plasma arcs and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps, usually employed to cure a composition utilized in the preferred method of the invention, have outputs of about 200 or 300 watts per inch across the length of the tube.

In practicing the method of the invention the liquid, curable composition may be applied to the porous substrate, for example, by brushing, dipping, roll coating, doctor blade coating, spraying, curtain coating, etc. Cure time will vary depending upon the particular formulation, the amount of composition applied to the substrate, etc. The film thickness of the cured coating may vary as desired. However, it has been found that advantages of the method of the invention can be obtained when the curable filler composition is applied to provide a wet film thickness of from about 1.5 mils to about 2.5 mils. Examples of applicable substrates include: particleboard, chipboard, composition board and paper. Moreover, the preferred, UV curable filler compositions of the invention can be readily UV cured in air at rates as least as high as 10 feet per minute per UV lamp operating at 200 watts per linear inch.

It has been found that the preferred UV curable filler compositions according to the invention are particularly suitable for filling warm or hot, wood-based, porous substrates. As discussed above, the problem of absorption of a filler composition into a wood-based porous substrate is particularly aggravated when the substrate is warm or hot, for example having a surface temperature of from about 38 to about 88 degrees Celsius. Such surface temperatures commonly occur, for example, in the manufacture of materials such as particleboard and chipboard at the point of application of the filler composition to the substrate.

It has also been found that preferred UV curable compositions of the invention based on the iminated unsaturated polyesters exhibit Newtonian viscosity behavior even at high pigment loadings. This behavior is surprising and is believed to contribute to the ability of these compositions to resist absorption by the warm or hot porous substrate such as wood during application of the composition to the substrate, for example utilizing a roll coater.

The examples which follow are submitted for the purpose of further illustrating the nature of the invention in its preferred embodiments.

As used in the body of the specification, examples, and claims, all percents, ratios and parts are by weight unless otherwise specifically indicated.

EXAMPLE 1

This example illustrates the preparation of an iminated, ethylenically unsaturated polyester resin suitable for the invention.

A reaction vessel equipped with means for steam distillation and a nitrogen sparge is charged with 1919 grams (g) fumaric acid, 2017 g diethyleneglycol, 4.0 g butyl stannoic acid, 0.40 g p-benzoquinone, and 0.40 g methyl p-benzoquinone. The charge is gradually heated to 210 degrees Celsius (°C.) while a total of 510 milliliters (ml) of distillate containing water and having a mass of 535 grams (g) is removed at a head temperature not exceeding 100° C. The resulting product is an unsaturated polyester resin having an acid value of 12.9. The unsaturated polyester is cooled to 80° C. at which temperature 32 g of N-hydroxyethyl ethylenimine is added to the polyester resin. The N-hydroxyethylethylenimine is reacted with the unsaturated polyester until the acid value of the product stalls at a value of 6.3. The resulting product is an iminated unsaturated polyester resin. The iminated unsaturated polyester is thinned with vinyl toluene (a reactive diluent) to a total solids content of 80 percent by weight (80 percent polyester resin/20 percent vinyl toluene) and is designated herein as Composition A. The iminated polyester resin has a number average molecular weight and a weight average molecular weight (determined by gel permeation chromatography utilizing a polystyrene standard, No. 6 MICROSTYRAGEL column, tetrahydrofuran solvent, 2.0 ml/min) of 1366 and 8577 respectively.

EXAMPLE 2

This example illustrates the preparation of a comparative ethylenically unsaturated polyester resin without imination utilized in the comparative ultraviolet light curable composition of Example 4.

A reaction vessel equipped with means for steam distillation and a nitrogen sparge is charged with 1919 g fumaric acid, 2017 g diethyleneglycol, 4.0 g dibutyl tin oxide, 0.40 g p-benzoquinone, and 0.40 g methyl p-benzoquinone. The charge is gradually heated to 210° C. while a total of 588 g of distillate containing water is removed at a head temperature not exceeding 100° C. The resulting product is an unsaturated polyester resin having an acid value of 12.9. The unsaturated polyester is thinned with 877 g of vinyl toluene to a total solids content of 78.6 percent by weight and a Gardner-Holdt viscosity of Z- and is designated herein as Composition B. The polyester resin has a number average molecular weight and a weight average molecular weight (determined by gel permeation chromatography utilizing a polystyrene standard, No. 6 MICROSTYRAGEL column, tetrahydrofuran solvent, 2.0 ml/min) of 1430 and 5899 respectively.

EXAMPLES 3 AND 4

Example 3 illustrates a filler composition containing the iminated unsaturated polyester thinned with vinyl toluene (Composition A) of Example 1 and the application of the filler composition to porous substrates derived from wood (particleboard and computer printout paper).

Example 4 is a comparative example and illustrates a filler composition containing the comparative unsaturated polyester thinned with vinyl toluene (Composition B) of Example 2 and the application of the filler composition to the same type of porous substrates (particleboard and computer printout paper).

TABLE 1

| | Composition | Amounts in grams | |
|---|---|---|---|
| | | Example 3 | Example 4 |
| (1) | Composition A of Example 1 | 1276.5 | 0.0 |
| (2) | Composition B of Example 2 | 0.0 | 510.0 |
| (3) | Vinyl toluene | 85.1 | 24.0 |
| (4) | Methyl p-benzoquinone | 0.42 | 0.2 |
| (5) | Talc[1] | 432.0 | 155.0 |
| (6) | Talc[2] | 432.0 | 155.0 |
| (7) | 2,2-Dimethoxy-2-phenylacetophenone[3] | 10.2 | 4.0 |
| (8) | Isobutyl benzoin ether[4] | 10.2 | 4.0 |
| (9) | Vinyl toluene | 22.0 | 10.1 |

[1]A platy, ultraviolet light transparent pigment having a mean particle size of 4 microns obtained as Mistron RCS from Cyprus.
[2]A platy, ultraviolet light transparent pigment having a mean particle size of 6.5 microns obtained as Beaverwhite 200 from Cyprus.
[3]A photoinitiator obtained as IRGACURE 651 from Ciba Geigy Corp.
[4]A photoinitiator.

The compositions of Examples 3 and 4 are prepared by first premixing components (1) or (2) with components (3) and (4) of Table 1. Next, components (5) and (6) are added slowly with agitation, and the resulting composition is mixed (ground) for about 3/4 to 1 hour, the temperature not exceeding about 77° C. Thereafter, the composition is allowed to cool to about 49° C. and components (7) through (9) are added with agitation. It should be noted that component (9), in each case is added to replace the amount of vinyl toluene vaporized from the composition during the pigment grinding step.

The viscosities of the resulting compositons of Examples 3 and 4 were measured at 25° C. using a Brookfield Viscometer, Model RVT with a No. 7 spindle operating at the speeds in revolutions per minute (rpm) as set forth in the following Table 2. The viscosities are given in centipoise (cps).

TABLE 2

| Composition | Revolutions per Minute | Viscosity in Centipoise |
|---|---|---|
| Example 3 | 5 | 20,800 |
| Example 3 | 10 | 22,000 |
| Example 3 | 20 | 22,000 |
| Example 3 | 50 | 21,920 |
| Example 3 | 100 | 21,600 |
| Example 4 | 5 | 48,000 |
| Example 4 | 10 | 32,000 |
| Example 4 | 20 | 22,000 |
| Example 4 | 50 | 15,200 |
| Example 4 | 100 | 12,000 |

As can be seen from Table 2, the composition according to the invention (Example 3), made utilizing the iminated unsaturated polyester resin, exhibits Newtonian viscosity behavior whereas the comparative composition (Example 4) exhibits non-Newtonian, shear thinning, viscosity behavior. It is surprising that the composition of the invention containing such a high level of pigment should exhibit Newtonian viscosity behavior. It is believed that the Newtonian viscosity behavior of the composition of the invention may contribute to the excellent ability of the composition to resist excessive absorption by hot particleboard during application using a rollcoater as described immediately below.

Each of the resulting compositions of Examples 3 and 4 is roll coated to a wet film thickness of from 1.5 to 2.5 mils on hot particleboard having a surface temperature of about 71° C. and cured by immediately passing the particleboard, wet film side up exposed to ambient air, at a rate of 7.5 feet per minute (2.3 meters/minute) beneath a medium pressure mercury vapor lamp (UV lamp) operating at 200 watts per linear inch.

The comparative filler composition of Example 4 penetrated (is drunk in by) the particleboard as evidenced by a very dull appearance to the particleboard and the roughness and surface imperfections of the particleboard, including pinholes, etc., being readily visible.

The filler composition of Example 3 (according to the invention) essentially did not penetrate the particleboard as evidenced by a smooth, glossy, cured film being readily apparent on the surface of the particleboard.

Each of the filler compositions of Examples 3 and 4 also is coated on one side of a sheet of dry computer paper. The comparative filler composition of Example 4 penetrated the paper as evidenced by the opposite side of the paper (i.e., opposite the side to which the composition was applied) being visibly wet. The filler composition of Example 3 (according to the invention) did not penetrate the paper as evidenced by the opposite side of the paper remaining dry.

EXAMPLES 5 AND 6

Examples 5 and 6 illustrate the preparation of iminated, ethylenically unsaturated polyester resins and liquid binders suitable for the invention utilizing N-hydroxyethyl ethylenimine and propylenimine in parts (b) and (c) respectively.

(a) A reaction vessel equipped with means for steam distillation and a nitrogen sparge is charged with 1919 grams (g) fumaric acid, 2017 g diethyleneglycol, 4.0 g dibutyltin oxide, 0.40 g p-benzoquinone, and 0.40 g methyl p-benzoquinone. The charge is gradually heated to 210 degrees Celsius (°C.) while a total of 469 g of distillate containing water is removed at a head temperature not exceeding 100° C. Heating is discontinued when the acid value stalls, and the charge is allowed to cool to room temperature. The resulting product is an unsaturated polyester resin having an acid value of 14.2.

(b) To 1000 g of the resulting product of part (a) above is added 9.5 g of N-hydroxyethyl ethylenimine. The resulting composition is heated to 82° C. and maintained at this temperature until the acid value of the product (as measured at 60 percent by weight solids in 2-ethoxy ethanol) stalls at 12.0 whereupon heating is discontinued and the product is allowed to cool. The resulting product is an iminated unsaturated polyester resin. The iminated unsaturated polyester is thinned with 251.6 g of vinyl toluene and the resulting composition is suitable as liquid binder for a composition of the invention. The binder has a solids content of 79.2 percent by weight, an acid value of 8.8 and a Gardner-Holdt viscosity of Z1.

(c) To 1000 g of the resulting product of part (a) above is added 9.5 g of propylenimine. The resulting composition is heated to 84° C. and maintained at this temperature until the acid value of the product stalls at 6.6 (as measured at 60 percent by weight solids in 2-ethoxy ethanol) whereupon heating is discontinued and the product is allowed to cool. The resulting product is an iminated unsaturated polyester resin. The iminated unsaturated polyester is thinned with 251 g of vinyl toluene and the resulting composition is suitable as liquid binder for a composition of the invention. The binder has a solids content of 79.3 percent by weight, an acid value of 4.8 and a Gardner-Holdt viscosity of Z1.

What is claimed is:

1. A porous substrate having adhered to a surface of said substrate, but not substantially penetrating said substrate, a cured filler from a composition comprising (1) a liquid, ungelled binder of an unsaturated polyester resin having a number average molecular weight of from 500 to 3,000 derived from an ethylenically unsaturated carboxylic acid or anhydride thereof having an acid functionality of at least two and an organic polyol, said unsaturated polyester resin having been reacted with an alkylenimine containing a hydroxyl group reactive with an acid group of said unsaturated polyester resin, (2) one or more ethylenically unsaturated compounds different from and cocurable with said unsaturated polyester resin, (3) a pigment, (4) a free radical initiator, and (5) optionally a carrier solvent for said filler composition.

2. The porous substrate of claim 1 wherein said filler composition is cured by exposure to ultraviolet light; said free radical initiator consists of a photocuring promoter selected from the group consisting of a photoinitiator, a photosensitizer and a mixture thereof; and said pigment is an ultraviolet light transparent pigment.

3. The porous substrate of claim 2 wherein said substrate is derived from wood.

4. The porous substrate of claim 2 wherein said unsaturated polyester resin is substantially linear, said ethylenically unsaturated carboxylic acid or anhydride thereof is a dicarboxylic acid or anhydride, and said organic polyol is a diol.

5. The porous substrate of claim 4 wherein said unsaturated polyester resin is prepared from said dicarboxylic acid or anhydride and said diol in a molar ratio of diol to acid of from about 1.10/1.00 to about 1.20/1.00.

6. The porous substrate of claim 5 wherein said dicarboxylic acid or anhydride is selected from the group consisting of maleic acid, maleic anhydride, fumaric acid, itaconic acid and a mixture thereof.

7. A method of minimizing absorption of a filler composition into a porous substrate comprising:
(A) applying to a surface of said porous substrate having a surface temperature of from about 38 to about 88 degrees Celsius, a curable filler composition comprising (1) a liquid, ungelled binder of an unsaturated polyester resin having a number average molecular weight of from 500 to 3,000 derived from an ethylenically unsaturated carboxylic acid or anhydride thereof having an acid functionality of at least two and an organic polyol, said unsaturated polyester resin having been iminated with an alkylenimine containing a hydroxyl group reactive with an acid group of said unsaturated polyester, (2) one or more ethylenically unsaturated compounds different from and cocurable with said unsaturated polyester resin, (3) a pigment, (4) a free radical interiator, and (5) optionally a carrier solvent for said filler composition; and (B) curing said filler composition on said surface.

8. The method of claim 7 wherein said curing is by exposure to ultraviolet light; said free radical initiator consists of a photocuring promoter selected from the group consisting of a photoinitiator, a photosensitizer and a mixture thereof; and said pigment is an ultraviolet light transparent pigment.

9. The method of said substrate is derived from wood.

10. The method of claim wherein said unsaturated polyester resin is substantially linear and said ethylenically unsaturated carboxylic acid or anhydride thereof is a dicarboxylic acid or anhydride and said organic polyol is a diol.

11. The method of claim 10 wherein said unsaturated polyester resin is prepared from said dicarboxylic acid or anhydride and said diol in a molar ratio of diol to acid of from about 1.10/1.00 to about 1.20/1.00.

12. The method of claim 11 wherein said dicarboxylic acid or anhydride is selected form the group consisting of maleic acid, maleic anhydride, fumaric acid, itaconic acid and a mixture thereof.

13. A curable filler composition which resists absorption into a porous substrate, comprising:
  (1) from 30 percent to 55 percent by weight of a liquid, ungelled binder of an unsaturated polyester resin having a number average molecular weight of from 500 to 3,000 derived from an ethylenically unsaturated carboxylic acid or anhydride thereof having an acid functionality of at least two and an organic polyol, said unsaturated polyester resin having been iminated with an alkylenimine containing a hydroxyl group reactive with an acid group of said unsaturated polyester,
  (2) from 50 percent to 10 percent by weight of one or more ethylenically unsaturated compounds different form and cocurable with said unsaturated polyester resin,
  (3) from 20 percent to 60 percent by weight of a pigment,
  (4) at least 0.33 percent by weight of a free radical initiator, and
  (5) from 0 percent to 10 percent by weight of a carrier solvent for said filler composition.

14. The composition of claim 13 which is curable by exposure to ultraviolet light; said free radical initiator consists of a photocuring promoter selected from the group consisting of a photoinitiator, a photosensitizer and a mixture thereof; and said pigment is an ultraviolet light transparent pigment.

15. The compositon of claim 14 wherein said ethylenically unsaturated carboxylic acid or anhydride thereof is a dicarboxylic acid or anhydride selected from the group consisting of maleic acid, maleic anhydride, fumaric acid, itaconic acid and a mixture thereof, and said organic polyol is a diol.

16. The composition of claim 15 wherein said unsaturated polyester resin is prepared from said dicarboxylic acid or anhydride and said diol in a molar ratio of diol to acid of from about 10/1.00 to about 1.20/1.00.

17. The composition of claim 15 which is curable by exposure to ultraviolet light and wherein said free radical initiator consists of a photocuring promoter selected from the group consisting of a photoinitiator, a photosensitizer and a mixture thereof.

* * * * *

UNITED STATES PATENT AND TRADEMARK OFFICE
CERTIFICATE OF CORRECTION

PATENT NO. : 4,788,108
DATED : November 29, 1988
INVENTOR(S) : Saunders, Jr. et al It is certified that error appears in the above-identified patent and that said Letters Patent is hereby corrected as shown below:

Column 13, line 10, claim 9; after "of" insert --claim 8 wherein--.

line 11, claim 10; before "wherein" insert --8--, line 22, claim 12; "form" should read --from--, Column 14, line 5, claim 13; "form" should read --from--, line 28, claim 16; "10" should read --1.10--.

Signed and Sealed this

Twenty-seventh Day of June, 1989

Attest:

DONALD J. QUIGG

Attesting Officer

Commissioner of Patents and Trademarks